July 12, 1927.

H. AUSTIN

CHANGE SPEED GEAR

Filed July 18, 1923

1,635,526

Herbert Austin, Inventor.
By S. M. McColl, atty.

Patented July 12, 1927.

1,635,526

UNITED STATES PATENT OFFICE.

HERBERT AUSTIN, OF BROMSGROVE, ENGLAND, ASSIGNOR TO THE AUSTIN MOTOR COMPANY LIMITED, OF NORTHFIELD, NEAR BIRMINGHAM, ENGLAND.

CHANGE-SPEED GEAR.

Application filed July 18, 1923, Serial No. 652,244, and in Great Britain July 18, 1922.

This invention relates to change speed gear used more especially in connection with motor road vehicles, and has for its object to improve the means by which the selector forks are moved and by which the fork or forks which is or are at the time inoperative is or are locked in the neutral position.

In carrying out this invention I may employ a change speed lever which is capable of being rocked about a universal joint and has the usual downward extension beyond such joint.

According to this invention the lower end of the said lever or other gear operating means connects with a point intermediate the ends of a transverse lever which at its ends is connected with the selector forks. The transverse lever is so arranged that it can be moved endwise that is to say in the direction of its length by a sideway movement of the gear operating lever or other device and such movement has the effect of causing one end of the transverse lever to engage with the casing of the gear or a part fixed in relation thereto when the lever may be rocked about the point of engagement, the other or free end of the lever operating one of the forks. The gear operating lever is preferably so arranged that it can only be moved sideways when the transverse lever is in its mid-position, and sideway movement in the opposite direction causes the other end of the transverse lever to engage with the casing or part fixed in relation thereto whereby the fork at the other end is released and can be moved. The forks are each permanently engaged with their respective ends of the lever, so that each fork becomes locked simply by the engagement of the respective end of the transverse lever with the casing or part fixed in relation thereto.

The engagement of the forks with the transverse lever may be by means of upward projections from the forks between which the lever passes.

In order that the invention may be clearly understood, I will describe a convenient practical application thereof by reference to the drawings herewith of which:—

In these drawings A is the gear operating lever fulcrumed to turn in any direction about a ball joint $a$ and having a downward extension $a'$ provided with a ball $a^2$. B is a transverse lever provided at its centre with a hole $b$ within which the ball $a^2$ lies. The lever B is provided at one end with two sets of curved faces $b'$ $b^2$ and at the other end with two sets of curved faces $b^3$ $b^4$ of which the curved faces $b'$ and $b^3$ extend somewhat above the level of the curved faces $b^2$ and $b^4$. The curved surfaces $b^2$ $b^4$ are adapted to engage between upwardly extending lugs $c$ $c'$ on the selector forks C C' while the curved surfaces $b'$ and $b^3$ are adapted to enter notches $d$ $d'$ cut in the inner edges of plates D D' which are fixed in relation to the casing E of the gear and also to engage between the lugs $c$ $c'$. F is the change speed gate of the usual construction.

Figures 1, 2:
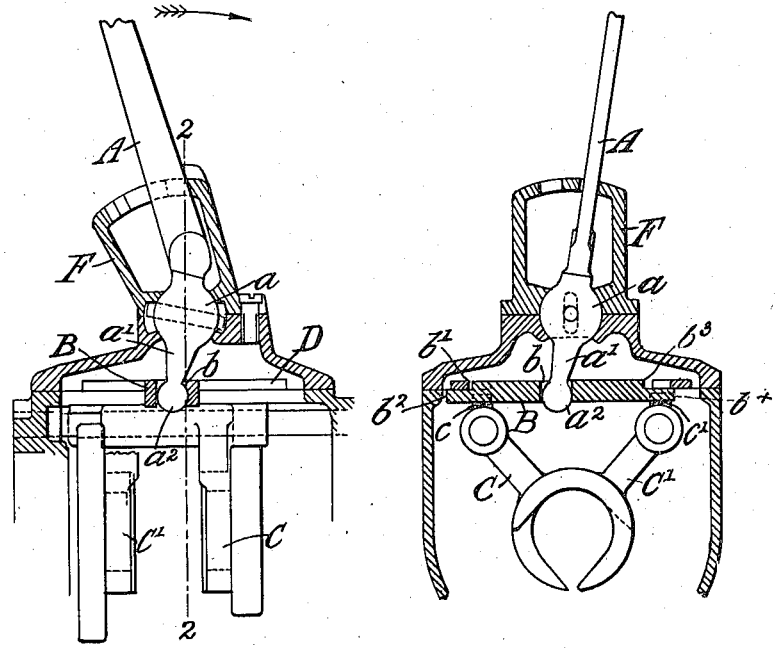
Figure 1 is a view in longitudinal section of a portion of a gear box provided with three speeds and reverse and constructed according to this invention.
Figure 2 is a transverse section taken on the line 2, 2, of Figure 1, but omitting the gear wheels.
Figures 3, 4:
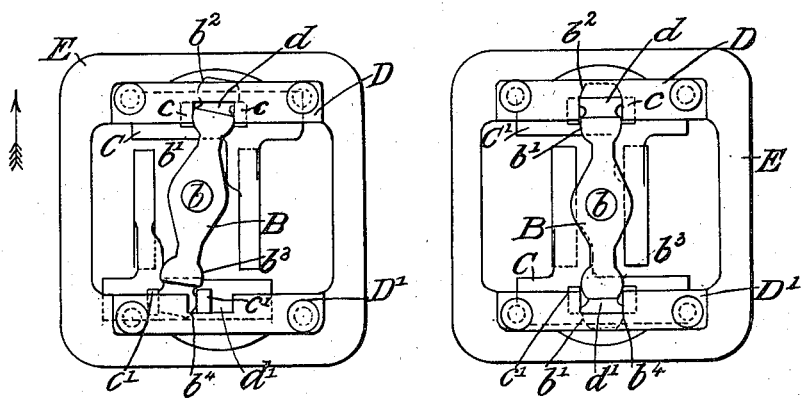
Figure 3 is a plan view of the portion of the gear shown in Figure 1, the top cover and gear operating lever being removed; and, Figure 4 is a view corresponding to Figure 3, but showing the transverse gear lever in its mid-position.

When the gear lever A is in the mid-position both longitudinally and transversely, the transverse lever B is in the position indicated in Figure 4, that is to say both the surfaces $b'$ and $b^3$ are engaged with their respective notches $d$ $d'$ so that the lever B is locked at both ends. Each end of the lever remains always in engagement with the respective selector fork so that both forks are also locked. When it is desired to put in one speed (or the reverse), the operating lever is moved to the fullest extent in one direction transversely. This has the effect of moving the lever B in the direction say of the arrow of Figure 3 until its faces $b'$ enter between the sides of the notch $d$ in the plate D and also between the lugs $c$ $c'$ of the fork C. The corresponding end of the lever then acts as the fulcrum and the corresponding fork C remains locked. The faces $b^3$ are, however, out of engagement with the notch $d'$ so that the corresponding end of the lever is free to be moved in either direction. The longitudinal movement of the lever A to the position indicated in Figure 1 and in the direction of the arrow thereof causes the lever B to be rocked to the position indicated in Figure 3. In such position it will be seen that the faces $b^4$ are in engagement between the lugs of the fork C' so that the selector fork C' may be moved to the left. In order to move the selector fork C the lever B is brought back to the mid-position, moved endwise to bring the faces $b^3$ into the notch $d'$ and free the faces $b'$ from the notch $d$ when the lever may be moved in the other direction taking the fork C with it.

Having fully described my invention, what I claim and desire to secure by Letters Patent, is:—

1. In change speed gear, a gear operating device, a transverse lever, at a point intermediate the ends of which the gear operating device engages in a manner to move the transverse lever lengthwise and laterally at will, a part at each side of the gear box into pivotal engagement with which the corresponding end of the lever may be moved, the lever then being adapted to be rocked by the gear operating device about such part as a pivot, and means whereby the free end of the lever moves a selector device for changing the gear.

2. In change speed gear, a gear operating device, a transverse lever at a point intermediate the ends of which the gear operating device engages in a manner to move the transverse lever lengthwise and laterally at will, a notch at each side of the gear box into engagement with which the corresponding end of the lever may be moved the lever then being adapted to be rocked by the gear operating device about such notch, and means whereby the free end of the lever moves a selector device for changing the gear.

3. In a change speed gear, a gear operating device, a transverse lever at a point intermediate the ends of which the gear operating device engages in a manner to move the transverse lever lengthwise and laterally at will, a part at each side of the gear box into pivotal engagement with which a corresponding end of the lever may be moved, the lever then being adapted to be rocked by the gear operating device about such part as a pivot, the two parts being placed at such a distance apart that when the lever is in its mid-position lengthwise it remains in engagement with both parts, and means whereby when the lever has been moved out of engagement with one part, and into engagement with the other, the free end of the lever may move a selector device for changing the gear.

4. In change speed gear, a gear operating device, a transverse lever at a point intermediate the ends of which the gear operating device engages in a manner to move the transverse lever lengthwise and laterally at will, a part at each side of the gear box into pivotal engagement with which the corresponding end of the lever may be moved, the lever then being adapted to be rocked by the gear operating device about such part as a pivot, a selector device for changing the gear in respect of each end of the transverse lever and connected thereto through the medium of lugs which embrace the sides of the lever.

5. In change speed gear, a gear operating device, a transverse lever at a point intermediate the ends of which the gear operating lever engages in a manner to move the transverse lever lengthwise and laterally at will, a notch at each side of the gear box into pivotal engagement with which the corresponding end of the lever may be moved, curved faces on each end of the lever adapted to enter the corresponding notch and a selector device in respect of each end for changing the gear and provided with lugs to come into engagement with the curved faces on the corresponding lever end.

6. In change speed gear, a gear operating device, a transverse lever at a point intermediate to the ends of which the gear operating device engages in a manner to move the transverse lever lengthwise and laterally at will, a part at each side of the gear box into pivotal engagement with which the corresponding end of the lever may be moved and a selector device for changing the gear provided with lugs which engage with the lever at a point along the length thereof which is substantially coincident with the point where the lever has pivotal engagement with the said part, whereby the movement of the transverse lever in relation to one such part produces no substantial amount of movement of the selector device at such end, whereby such selector device remains locked.

In witness whereof I have hereunto signed my name this 3rd day of July, 1923.

HERBERT AUSTIN.